Sept. 9, 1969  W. M. FLOOK, JR  3,465,589
APPARATUS FOR MEASURING YARN TEMPERATURE
Filed July 15, 1966  4 Sheets-Sheet 1

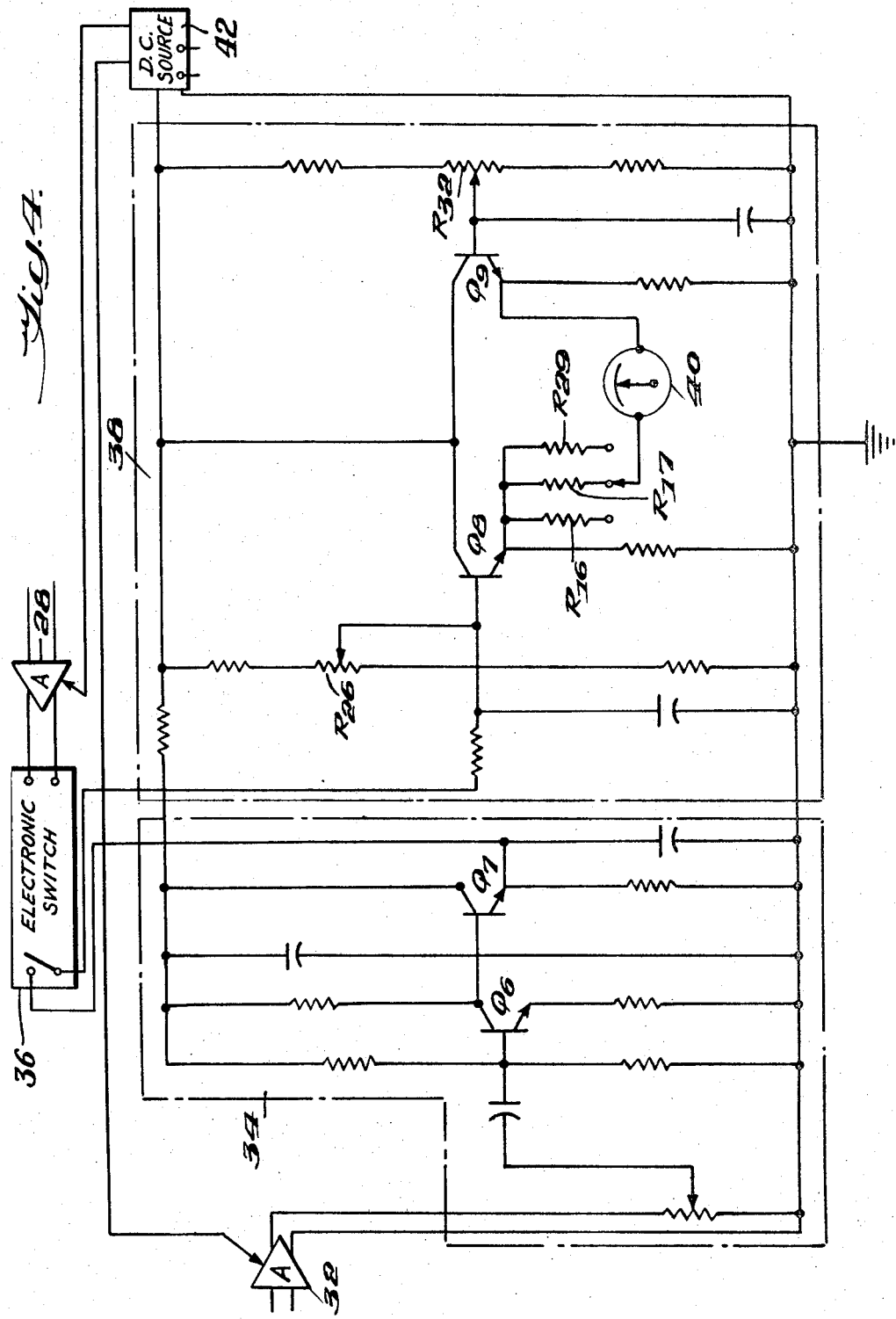

Sept. 9, 1969   W. M. FLOOK, JR   3,465,589
APPARATUS FOR MEASURING YARN TEMPERATURE
Filed July 15, 1966   4 Sheets-Sheet 3
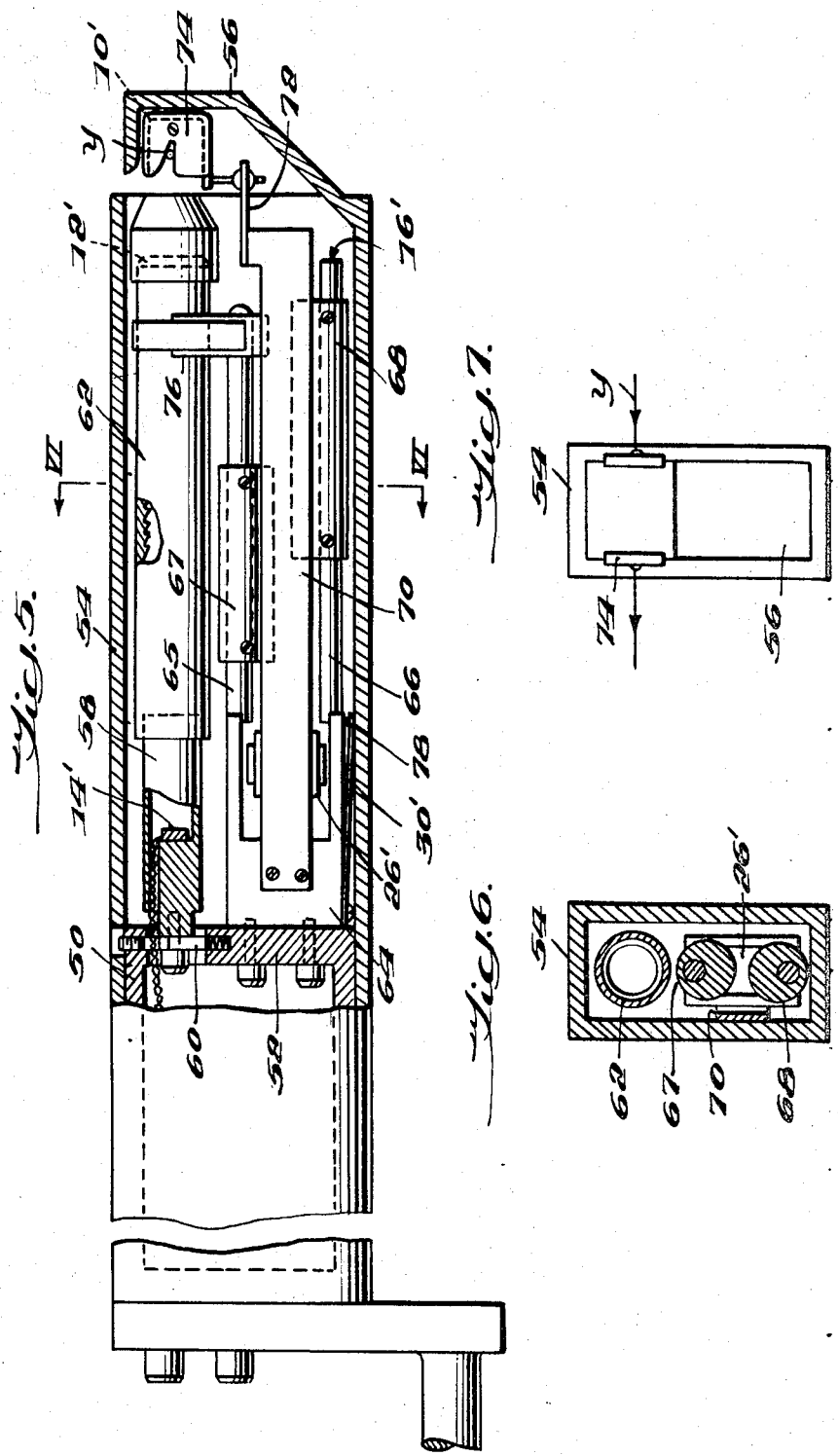

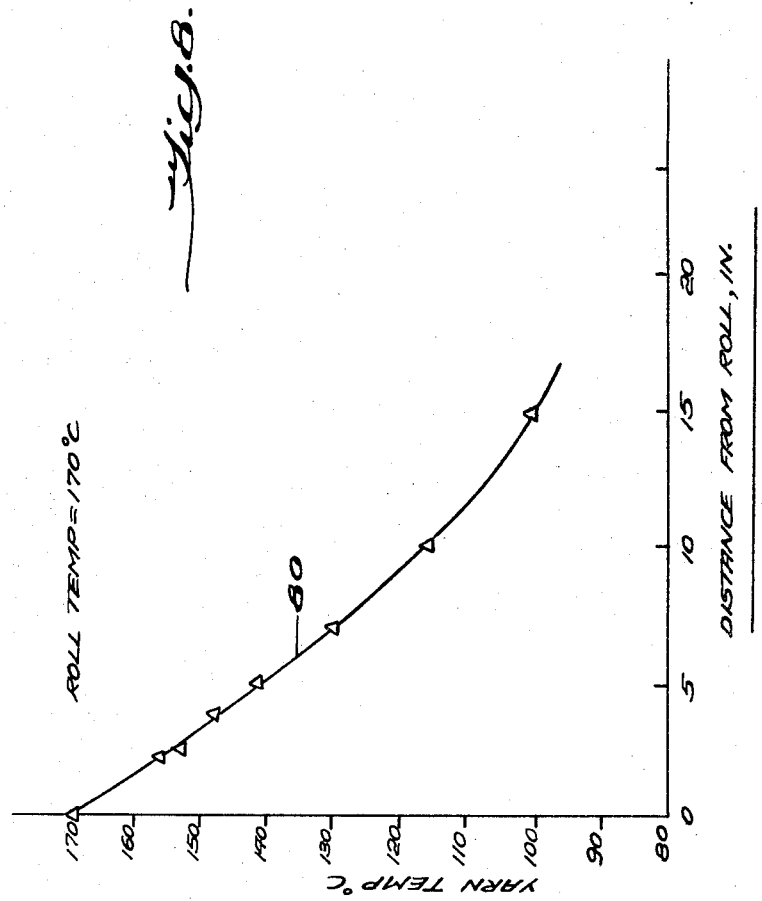

United States Patent Office 3,465,589
Patented Sept. 9, 1969

3,465,589
APPARATUS FOR MEASURING YARN TEMPERATURE
William M. Flook, Jr., Greenville, Del., assignor to E. I. du Pont de Nemours and Company, Wilmington, Del., a corporation of Delaware
Filed July 15, 1966, Ser. No. 565,429
Int. Cl. G01k *11/00, 5/52*
U.S. Cl. 73—355                    4 Claims

ABSTRACT OF THE DISCLOSURE

An infrared pyrometer, suitable for non-contacting yarn temperature measurement, which includes optically aligned detection, focusing, and adjustable radiation source elements. A yarn advancing through the source is scanned by mechanical oscillation of the focusing and/or reference elements. Electronic circuitry which includes a phase adjusting amplifier, a synchronous detector with a null meter, adjustable heater, and thermocouple thermometer for the radiation source and electromagnetic driver for the oscillator enable positive or negative meter readings when yarn is hotter or colder than source respectively and adjustment of source temperature to achieve null reading where yarn temperature is equal to indicated source temperature.

---

This invention relates generally to the production of yarn from synthetic polymers and, more particularly, to the control of process conditions having an influence on yarn temperature.

Although instruments for measuring the temperature of a running yarn line are available, they are both complicated and expensive. The fact that known instruments depend on some type of direct contact between the yarn and a temperature sensor makes them insensitive and unreliable, even at low and intermediate speeds of yarn advance.

Infrared instruments in which a photoconductive detector is positioned to receive radiations alternately from a test object and a heated reference source are also available, but their construction and operation are not such as to be of utility in the measurement of yarn temperatures. By comparison with the apparatus disclosed herein, none of the known pyrometers array the heated reference source behind a test object and cause the object to disappear as the energy level supplied to tthe reference is adjusted.

The various objectives and advantages set forth in the following specification have been achieved with a temperature-measuring apparatus which includes optically aligned detection, lens and reference radiation elements. A yarn advancing between the lens and reference elements is scanned by mechanical oscillation of the lens and/or reference elements.

In the drawings:

FIG. 4 is a circuit diagram of the phase-shift amplifier, synchronous detector and meter components shown in FIG. 1;

FIG. 5 is a side elevation of the preferred instrument embodiment, parts having been broken away and shown in section to reveal details of construction;

FIG. 6 is a sectional view taken on line VI—VI in FIG. 5;

FIG. 7 is an end view of the instrument shown in FIG. 5; and

FIG. 8 is a graph showing typical data used in calibrating the apparatus of this invention.

Figure 1:
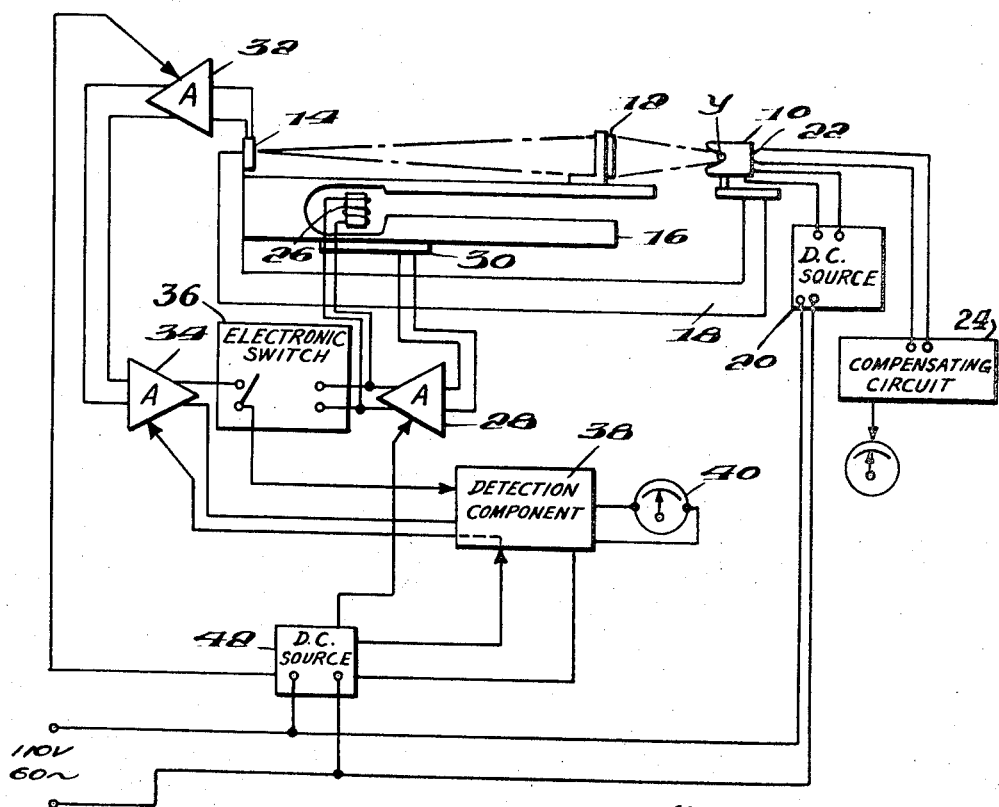
FIGURE 1 is a schematic illustration of a simplified embodiment of the mechanical and optical systems along with a block diagram of the associated electronic circuitry.

The embodiment shown in FIG. 1 includes a reference source 10 of infrared radiations, an infrared transparent lens 12, a lead sulfide detector cell 14, a tuning fork 16, and associated electronic circuitry. Fork 16 has tines interconnected by a yoke which is affixed to one leg of a U-shaped instrument support 18. Detector cell 14 is mounted on an upstanding leg of support 18 just above the yoke of fork 16. Lens 12 is bracketed to the upper tine. Reference source 10 is affixed to the other leg of support 18 and includes a C-shaped radiation element (FIG. 2) with its open side directed toward lens 12 and detector 14, i.e., is so positioned that emitted radiation impinges on lens 12, which in turn images the radiation on detector 14. A running yarn line Y is guided horizontally through the interior of reference 10 by slotted end pieces and withdrawn by suitable takeup rolls. An electric heater is placed on all three sides of the radiation element and is energized by an adjustable source 20 of direct current (DC), e.g., by a powerstat and rectifier. Details of the radiation element and heater are shown and described in connection with FIGS. 2, 3. A thermocouple having its hot junction 22 fixed centrally on the back side of source 10 is connected to a cold junction compensating circuit 24 and thence to a temperature-indicating meter.

The tines of tuning fork 16 are vibrated by an electromagnet 26 having its coil connected to the output of an amplifier 28. A synchronizing transducer 30 in the form of a piezoelectric crystal is connected to amplifier 28. Transducer 30 is mechanically linked to the lower tine of tuning fork 16.

Infrared detector cell 14 is connected to a preamplifier 32 which in turn is connected to phase-shift amplifier 34. Output from amplifier 34 is connected through an electronic switch 36 to a detection component 38. Output of detection component 38 is connected to a null-type meter 40. Switch 36 also receives the output of amplifier 28 and is thereby energized in synchronism with the vibration of fork 16. A second DC supply 42 furnishes power to pre-amplifier 32, amplifier 28, detector 38 and amplifier 34. Power for DC sources 20, 42 is furnished from the illustrated 110 volt, 60 cycle, power line.

In operation, the AC power is switched "on" to initiate vibration of tuning fork 16 and to energize the various electronic circuits. The apparatus is positioned so that a yarn line, whose temperature is to be measured, advances through the reference source 10. Detector 14 receives radiation alternately from yarn Y and reference 10 due to the oscillation of lens 12 with the upper tine of tuning fork 16. Vibration transducer 30, switch 36 and detector 38 are so interrelated that a positive reading appears on meter 40 when yarn Y is hotter than reference 10 and a negative reading when its temperature is lower. In other words, the apparatus operates by comparing radiation from the yarn with radiation from the reference source mounted around and behind the yarn.

When reference 10 is cold compared to yarn line Y, such as at start-up, a high positive reading appears on meter 40. Then, power to radiation reference 10 from source 20 is increased gradually until the needle of meter 40 indicates a null, at which time reference 10 and yarn Y are at the same temperature. This temperature is measured by means of thermocouple junction 22 and is indicated on the meter shown with the associated compensating circuit 24.

Figure 2:
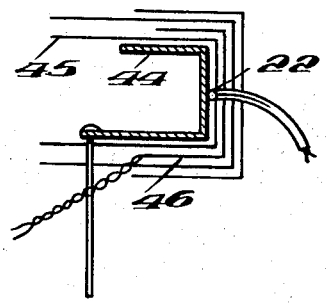
FIG. 2 is an enlarged side view of parts of the reference source shown in FIG. 1 before their final assembly.

In FIG. 2, parts of reference source 10 are shown before final assembly. First, a stainless steel radiation element 44 is shaped in the form of three sides of a rectangular box. The inner surface of this enclosure is sandblasted. Thermocouple junction 22 is silver-soldered to the center of the back surface of element 44 and has lead wires connected thereto. A layer of glass tape 45 is pressed onto the outer surface of element 44 outside of which heater strip 46 is next placed. The heater strip is covered by two more layers of pressure sensitive glass tape.

Figure 3:
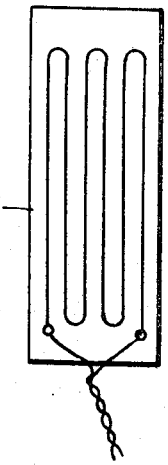
FIG. 3 is an enlarged view of the electrical heater, before being shaped around the outside of the radiation element.

As shown in FIG. 3, heater strip 46 includes elongated loops of resistance wire (#32 Nichrome V) on a piece of pressure-sensitive glass tape. Two lengths of number 30 "Teflon" insulated copper wire are silver-soldered to the ends of the resistance wire to provide connections to DC power supply 20. Heater 46 can then be folded around the reference radiation element 44 (FIG. 2). A pair of slotted end pieces complete the assembly (FIGS. 1, 5).

Preamplifier 32 is of conventional design employing three transistor (Type 2N3566) gain stages and an output emitter follower (also a Type 2N3566 transistor), all located physically within support 18.

With reference to FIG. 4, amplifier 34 employs two transistors $Q_6$ and $Q_7$, which also are Type 2N3566. In this component, a signal from detector 14 and preamplifier 32 is amplified further and presented to electronic switch 36 (Model 24-P, Brower Laboratories, Inc.) which functions to turn on that portion of the pulsating signal coming from amplifier 34 corresponding to the time when the optical lens system is scanning yarn line Y and to cut out that portion of the signal corresponding to the time when the optical system is scanning reference source 10. In other words, the detected signal passes from amplifier 34 to detector 38 only when switch 36 is closed responsive to fork drive amplifier 28, i.e., a synchronism with the vibration of fork 16. In this way a negative signal is provided to detector 38 when the yarn line is at a temperature lower than the reference and a positive signal when the yarn line is hotter than the reference. Detector 38 includes two transistors $Q_8$ and $Q_9$ (both Type 2N3566), meter 40 and resistors $R_{16}$, $R_{17}$, $R_{29}$, which elements function in the same manner as a vacuum tube voltmeter (VTVM). Potentiometers $R_{26}$ and $R_{32}$ are provided for zero balance, whereas resistors $R_{16}$, $R_{17}$ and $R_{29}$ are provided for changes in range of meter 40 (a 50-0-50 microammeter). Zero balance is accomplished after the preliminary adjustment of DC supply 20 to the point where the meter needle is stationary.

The fork drive circuit 28 is a conventional power amplifier and, therefore, has not been shown in detail. It comprises two stages of amplification employing two 2N3566 power transistors and one 2N1547 power transistor. Transducer 30 furnishes a vibration responsive signal to amplifier 28. The output is fed back to the driving coil of electromagnet 26.

The preferred embodiment shown in FIGS. 5–7 includes a hollow mounting block 50 having an end wall 52. A preamplifier of the type shown at 32 in FIG. 1 is located in block 50 and is connected by leads extending through the illustrated slot in wall 52 to detector 14'. A housing 54 is telescoped on mounting block 50. Housing 54 includes a shaped end piece 56 which leaves a lateral opening for the introduction of yarn line Y. Detector 14' is located within a tubular light hood 58 and cemented to its solid end. The latter is fastened to a slide plate 60 which is vertically adjustable between the illustrated set screw and tension spring. The hollow end of hood 58 projects into a second hood 62 within which lens 12' is mounted. There is sufficient clearance between hoods 58, 62 to facilitate vertical adjustment of slide plate 60 and still allow for the vibration of hood 62 and lens 12' with tuning fork 16'.

Fork 16' has a yoke 64 to which are silver-soldered lines 65, 66 made from cylindrical drill rod. Electromagnet 26' is also bracketed to yoke 64. Adjustable tine weights 67, 68 are drilled to fit over tines 65, 66, respectively, and are provided with set screws to hold them in place after final adjustment of tuning fork frequency. Yoke 64 is fastened to end wall 52 by means of cap screws. An elongated support bracket 70 is fastened at one end to yoke 64 and extends out parallel to tines 65, 66 and beyond the ends thereof. Bracket 70 is provided with a platform 72 which supports a stud depending from reference source 10'.

End pieces 74 are held in place, against the sides of reference 10', by means of a through bolt. As mentioned previously, pieces 74 are provided with slots which serve as guides for yarn Y in its advance through reference 10'. Edges of the guide slots are rounded and finished with a ceramic threadguide material such as Alsimag.

A saddle bracket 76 is fastened to the outer end of tine 65 to receive lens hood 62. Hood 62 is fastened to saddle bracket 76 by means of a strap, after having been positioned to focus radiation from yarn Y onto detector 14'. As illustrated, the inner surface of tube 62 is provided with saw-toothed threads. In addition, the inner surfaces of hoods 58, 62 are coated with flat black paint to minimize internal reflections.

Transducer 30' is a thin piezoelectric plate which is manufactured by the Clevite Company and sometimes referred to as an elongated bi-morph bender. It is fastened at one end to yoke 64 and spaced slightly at the other end by a wire 78 located adjacent the end of one leg of yoke 64. Thus, it is flexed in synchronism with vibrations of tine 66.

The effects of varying yarn transparency are minimized by the construction of the reference source. This is accomplished since the source is in the form of a uniformly heated cavity which almost entirely encloses the yarn. As such, the entire radiating system closely approaches a classical "black-body" and, accordingly, errors due to emissivity mismatch are reduced to a minimum.

Precision and sensitivity of the device have been measured in several ways. For example, the running yarn line was passed over a heated roll of known temperature with enough wraps to insure that the yarn reached roll temperature at the speeds employed. Measurements of yarn temperature were then made, with an instrument of the type shown in FIG. 1, at a series of distances from the heated roll. The plotted points for curve 80 in FIG. 8 show values of measured yarn temperature against distance from the roll. These were found to extrapolate very closely back to the roll temperature. This technique was repeated for several different temperatures, yarn speeds, and yarn polymer types. Very good agreement was found in each case.

Detector 14 is a lead sulfide photoconductive element which is preferred because it is small, inexpensive and rugged. In addition, it has a peak detectivity at room temperature which is about ten times that of the best vacuum thermocouple and one hundred times that of a thermister bolometer. Furthermore, response time of the lead sulfide detector is such that it can be used at frequencies up to at least 1000 cycles per second. For this reason, its capability is much higher than that of any other thermodetector now available. However, other photoconductive detectors may be used, e.g., those of indium antimonide, indium arsenide, lead selenide or even a thermister bolometer. Since these different detectors are sensitive to longer wave length radiation than the lead sulfide detector, they are more suitable for measuring the temperature of yarns made of special polymers in that they facilitate use of a radiation wave band in which the polymer is much more opaque than in the sensitivity region of a lead sulfide detector.

In both of the illustrated embodiments, a reference radiation element is mounted on a stationary support in optical alignment with a photoconductive detection element. Instead, the reference source could be mounted toward the end of the same tine as the lens element for vibration therewith, in which event the associated yarn guides would be attached to a stationary part of the instrument. Other changes and modifications of a similar nature will occur to those skilled in the art without departing from the spirit of the present invention.

Having thus described the invention, what is claimed as new and desired to be secured by Letters Patent is:

1. In a yarn temperature-measuring apparatus including optically aligned detector, lens and reference radiation elements, a mechanically oscillatable mount for said lens element, said lens element being attached to said mount for oscillation of the optical path across a yarn advancing between the lens and reference radiation elements.

2. In a yarn temperature-measuring apparatus including optically aligned detector, lens and reference radiation elements and indicator circuitry coupled to the detector element, a mechanically oscillatable mount for said lens element, the latter being attached to said mount for vibration therewith and for oscillation of the optical path between said detector and reference radiation elements across a yarn located between the lens and references radiation elements.

3. The apparatus of claim 2 wherein said detector element is photoconductive and wherein said circuitry includes amplification and synchronous detection components as well as a meter receiving the output of said detection component.

4. The apparatus of claim 3 wherein said mount is comprised of a tuning fork having a pair of tines and wherein is provided an electrically responsive vibration transducer coupled to one of said tines, an amplifier receiving the output of said transducer and an electromagnet receiving the output of said amplifier, said electromagnet being associated with said tuning fork for imparting vibration thereto and wherein said synchronous detection component includes an electronic switch also connected to and receiving the output of said amplifier, said yarn being so positioned with respect to the lens and reference elements as to be imaged on the detector element when the electronic switch is closed.

References Cited

UNITED STATES PATENTS

| | | | |
|---|---|---|---|
| 2,963,910 | 12/1960 | Astheimer | 73—355 |
| 2,978,589 | 4/1961 | Howell. | |
| 3,081,632 | 3/1963 | Howell | 73—355 |
| 3,178,579 | 4/1965 | Zuckerbraun | 250—203 |
| 3,207,027 | 9/1965 | Bouchet | 73—355 XR |

OTHER REFERENCES

McFee, R. H. Blackbody Source Unit ... In the Review of Scientific Instruments, vol. 23, No. 1. pp. 52 and 53. Janaury 1952.

LOUIS R. PRINCE, Primary Examiner

FREDERICK SHOON, Assistant Examiner.